(12) United States Patent
Cooley et al.

(10) Patent No.: US 7,849,999 B1
(45) Date of Patent: Dec. 14, 2010

(54) CONVEYOR TENSIONING SYSTEM

(75) Inventors: Njell J. Cooley, Davenport, IA (US); Timothy A. Grillot, Milan, IL (US); Larry D. Jones, Bennett, IA (US)

(73) Assignee: The Schebler Co., Bettendorf, IA (US)

( * ) Notice: Subject to any disclaimer, the term of this patent is extended or adjusted under 35 U.S.C. 154(b) by 0 days.

(21) Appl. No.: 12/409,971

(22) Filed: Mar. 24, 2009

Related U.S. Application Data (60) Provisional application No. 61/070,532, filed on Mar. 24, 2008.

(51) Int. Cl.
*B65G 23/44* (2006.01)
(52) U.S. Cl. .................................. 198/813; 198/861.1
(58) Field of Classification Search ............... 198/813, 198/861.1
See application file for complete search history.

(56) References Cited

U.S. PATENT DOCUMENTS

| | | | |
|---|---|---|---|
| 2,558,832 A * | 7/1951 | Eriksson | 198/813 |
| 3,732,970 A * | 5/1973 | Nakanishi et al. | 198/813 |
| 4,128,164 A | 12/1978 | Sandberg | |
| 5,046,603 A | 9/1991 | Odenthal | |
| 5,456,348 A | 10/1995 | Whetsel et al. | |
| 5,458,051 A * | 10/1995 | Alden et al. | 198/813 |
| 6,269,231 B1 * | 7/2001 | Castelli et al. | 198/813 |
| 6,935,487 B2 | 8/2005 | Schaum et al. | |
| 7,234,586 B1 | 6/2007 | Newman | |

* cited by examiner

*Primary Examiner*—James R Bidwell
(74) *Attorney, Agent, or Firm*—Hamilton IP Law, PC; Jay R. Hamilton; Charles A. Damschen (57) ABSTRACT

A method and apparatus for a conveyor tensioning system comprising a main frame with at least one main frame roller pivotally mounted thereto for engagement with a conveyor belt. A moveable frame is engaged with the main frame at an engagement interface such that the position of the moveable frame with respect to the main frame may be adjusted in at least one dimension. The moveable frame also includes at least one moveable frame roller pivotally mounted thereto for engagement with a conveyor belt. The position of the moveable frame with respect to the main frame may be actuated by hydraulic cylinders or other mechanical systems. As the distance between the main frame and moveable frame increases, the tension on the belt also increases.

15 Claims, 8 Drawing Sheets

CONVEYOR TENSIONING SYSTEM

CROSS REFERENCE TO RELATED APPLICATIONS

Applicant claims priority under 35 U.S.C. §119(e) of provisional U.S. Patent App. No. 61/070,532 filed on Mar. 24, 2008, which is incorporated by reference herein in its entirety.

FIELD OF INVENTION

Food processing equipment and more particularly, a conveyor for manufacture of food products, and in particular to a new and improved tensioning system for use with conveyor systems in the production of food products.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

A conveyor system typically comprises a plurality of rollers and a conveyor belt engaged with the rollers. Such conveyor systems include an upper portion that serves to transport the product carried on the conveyor belt from a first end of the conveyor system to the second end thereof. A lower portion serves as the conveyor belt return pathway, through which the conveyor belt travels from the second end of the conveyor system to the first end thereof. Typically, the return path or lower portion of the conveyor belt is relatively slack. Most clean-in-place systems and/or tensioning system are positioned on the lower portion of the conveyor system since that portion of the conveyor system is not designed to engage the product.

Conveyor systems are widely used in cooling tunnels. Cooling tunnels typically include a housing with a conveyor system therein for moving the product through the cooling tunnel. Blowers or fans provide for moving refrigerated or chilled air and other cooling gases, such as carbon dioxide, over the product. In many applications the conveyor belt is formed with a plurality of apertures to permit flow of the cooled gases through the conveyor belt. The cooled or chilled gases may be introduced by a number of systems including by spraying liquid carbon dioxide into the cooling space to provide chilled air and carbon dioxide gas for cooling. Movement of the gases over the food product is enhanced by exhaust ducts and fans.

Problems are encountered in the operation of such cooling tunnels, particularly with high capacity tunnels providing for high speed movement of the product through the tunnel and for high velocity of cooling gas flow. In such tunnels, the conveyor system may collect and/or trap food particles creating a potentially unsanitary condition. This issue is especially acute in the conveyor return portion of the cooling tunnel as it is typically positioned underneath the main conveyor. This is especially the case in situations where the product positioned on the conveyor belt is "tacky," (e.g., products such as caramel, sugar solutions, and chocolate nougat), which have a tendency to stick to or collect on the food processing equipment. Contact of a tacky material with the conveyor belt often results in the transfer and/or accumulation of the tacky material on the conveyor return rollers. Accumulation or transfer of the material onto the conveyor return rollers may inhibit proper operation of the conveyor belt, contaminate the conveyor belt and interfere with maintaining the proper tension on the conveyor belt.

SUMMARY OF THE INVENTION

The conveyor tensioning system provides an efficient structure to easily adjust the tension on a conveyor belt and placement of scrapers on the return roller. The exemplary embodiment as pictured herein is especially suited to applications of cooling tunnels used in the manufacture of food products, and in particular to for use in high speed production of food products. The cooling tunnel as pictured herein, to which the conveyor tensioning system may be applied, is used for the cooling of baked products and the like prior to subsequent operations such as stacking or cutting and frying.

The conveyor tensioning system allows taunt operation of the conveyor belt while simultaneously allowing both the conveyor belt and conveyor rollers to be cleaned or scraped during operation to improve reliability and operation of the cooling tunnel.

It is an object of the conveyor tensioning system to provide a conveyor tensioning system that is adjustable and inhibits collection or accumulation of food particles in the return portion of the conveyor.

It is another object of the conveyor tensioning system to inhibit collection or accumulation of tacky food particles with a tendency to adhere to various elements of a cooling tunnel and/or conveyor system.

It is another object of the conveyor tensioning system to inhibit debris or food particles cleaned from the conveyor belt and conveyor return rollers from falling back onto to the product side of the conveyor belt.

These and other objects, advantages, features, and results more fully appear in the course of the following description.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION-LISTING OF ELEMENTS

| ELEMENT DESCRIPTION | ELEMENT # |
| --- | --- |
| Conveyor tensioning system | 10 |
| Air handler | 11 |
| Cooling tunnel | 12 |
| Conveyor belt | 14 |
| Conveyor first end | 15a |
| Conveyor second end | 15b |
| Guard plates | 19 |
| Main frame | 20 |
| Main frame roller retainer | 21 |
| Main frame channel member | 22a |
| Main frame side member | 22b |
| Main frame bottom member | 23 |
| Vertical member | 24 |
| Vertical rail | 25 |
| Main frame roller | 26 |
| Scraper | 28 |
| Moveable frame | 30 |
| Moveable frame roller retainer | 31 |
| Moveable frame side member | 32 |
| Angle member | 34a |
| Angle member retainer | 34b |
| Vertical rail engagement member | 35 |
| Moveable frame roller | 36 |
| Sliding member | 37 |
| Actuator | 38 |
| Actuator brace | 39 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
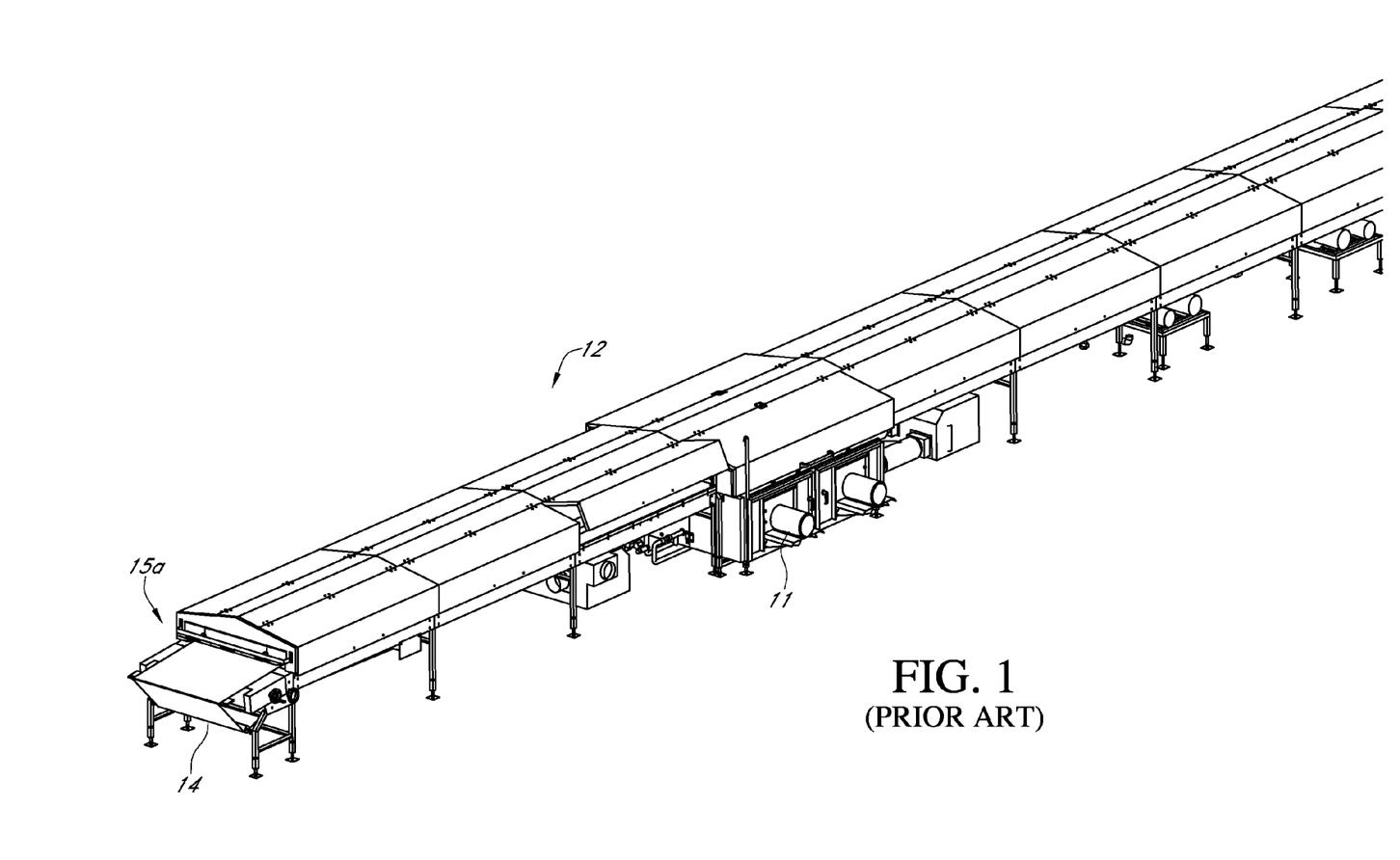
FIG. 1 is a simplified perspective view of a cooling tunnel incorporating an exemplary embodiment of the conveyor tensioning system.

Referring now to the drawings, wherein like reference numerals designate identical or corresponding parts throughout the several views, FIG. 1 illustrates a perspective view of a prior art cooling tunnel 12 having a conveyor system installed therein to move product from one position to another. The conveyor tensioning system 10 may be incorporated into conveyor systems such as those used with cooling tunnels 12 like that shown in FIG. 1, but may generally be used with any conveyor system.

Cooling tunnels 12 are well known in the art as illustrated by U.S. Pat. No. 5,123,261 issued to Cope for "Cooling Tunnel for Food Products," which is incorporated by reference herein in its entirety. Furthermore, conveyor systems in general are well known to those skilled in the art. As partially illustrated in FIG. 1 but well understood by those of ordinary skill in the art, the cooling tunnel 12 is an elongated structure typically formed with a thermally insulated side, top, and bottom walls with a conveyor belt 14 running therethrough. The cooling tunnel 12 includes a product entrance at the conveyor first end 15a and a product exit at the conveyor second end 15b.

The conveyor belt 14 carries the products into and throughout the entire length of the cooling tunnel 12, and the various elements used to cause and/or facilitate the movement of the conveyor belt 14 through the cooling tunnel 12 may generally be referred to as the conveyor system. The conveyor belt 14 is driven by one of any number of drive systems (not shown) for powering the drive roller(s) (not shown), which drive systems are well known to those of skill in the art including chain, sprocket, shaft, and belt drives. Furthermore, as is known in the prior art, certain structures are necessary to keep the conveyor belt 14 on track within the cooling tunnel 12, which structures are also not discussed herein for purposes of clarity. As is also known in the prior art, certain structures are necessary to clean the conveyor belt 14, such as a clean-in-place system. Because these features are well known in the art, further discussion and illustration is unnecessary.

As shown, the cooling tunnel 12 includes an air handler 11 that provides a flow of conditioned air to contact products on the conveyor belt 14 and remove heat from those products. Other fluids that may be used to cool products on the conveyor belt 14 include chilled air, heated air, nitrogen gas, carbon dioxide gas, or other relatively inert gases or vapors known to those skilled in the art suitable for the particular application. The air handlers 11 and cooling tunnel 12 may also be configured to use liquid carbon dioxide or nitrogen to remove heat from products in the cooling tunnel 12. In other embodiments not pictured herein but well known to those skilled in the art, heat removal may be supplied through a chilled plate system (not shown) positioned underneath the conveyor belt 14. As heat removal systems are well known in the prior art, further discussion as to a particular system or means is unnecessary.

The conveyor tensioning system 10 is particularly suited for use with cooling tunnels 12 used to process food products, as is the type of cooling tunnel 12 illustrated in FIG. 1, but is not so limited. By way of illustration and without limitation, in applications involving food products, during operation of the cooling tunnel 12, excess food particles or debris may gather on the conveyor belt 14 and the conveyor rollers. This may create an unsanitary condition within the cooling tunnel 12 as excess perishable material may adhere to components of the cooling tunnel 12 that come into contact with the portion of the conveyor belt 14 that contacts the product.

Figure 2:
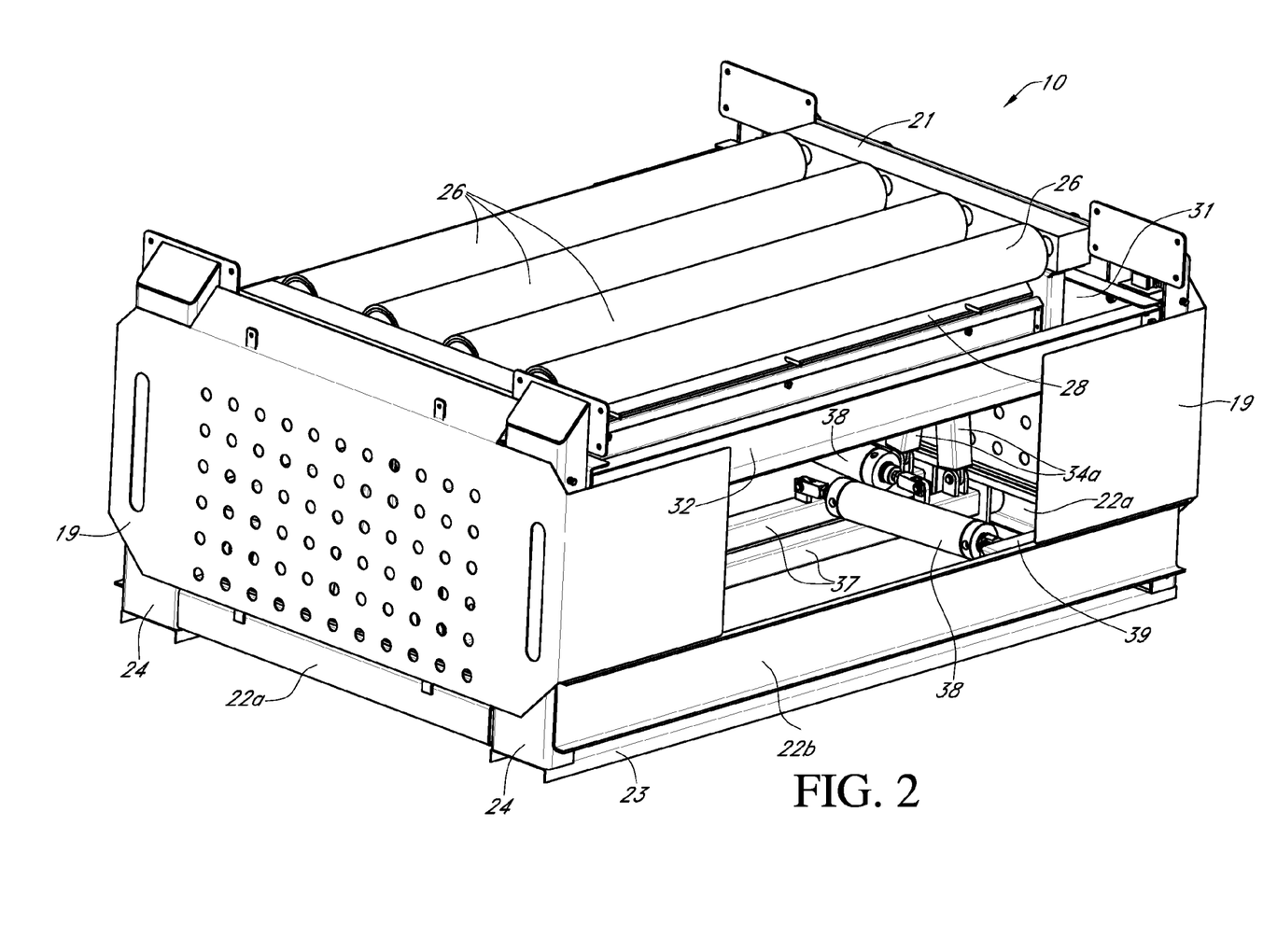
FIG. 2 is a detailed perspective view of an exemplary embodiment of the conveyor tensioning system that includes guard plates.

A perspective view of the exemplary embodiment of the conveyor tensioning system 10 is shown in FIG. 2. The conveyor tensioning system 10 is shown with guard plates 19 in FIG. 2, which have been removed for clarity in FIG. 3. The exemplary embodiment includes a main frame 20 and a moveable frame 30. The main frame 20 and moveable frame 30 are configured to allow the position of the moveable frame 30 to be adjusted with respect to the main frame 20 in one dimension.

Figure 5:
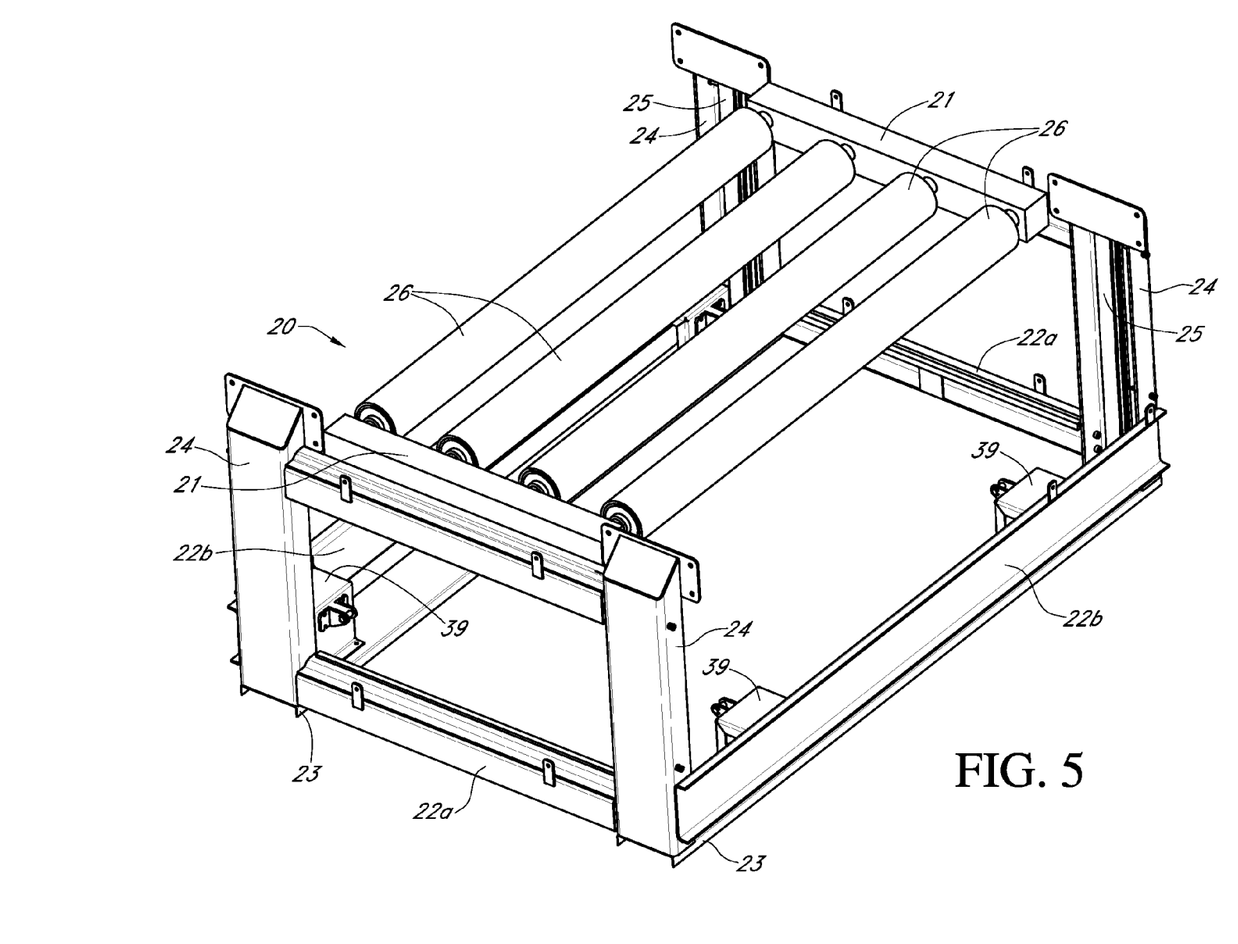
FIG. 5 is a detailed perspective view of one embodiment of the main frame assembly with the moveable frame assembly removed for clarity.

The main frame 20 is shown in FIG. 5 with certain elements of the moveable frame 30 removed for purposes of clarity. The main frame 20 includes two main frame roller retainers 21, which are oriented parallel to one another on opposite ends of the conveyor tensioning system 10. Pivotally mounted between the two main frame roller retainers 21 are four main frame rollers 26. However, any number of main frame rollers 26 may be used, and the optimal number thereof will depend on the specific application of the conveyor tensioning system 10. Furthermore, although not depicted in the exemplary embodiment, the main frame rollers 26 may be the drop-in type, which may be easily removed from the main frame roller retainers 21 when the conveyor belt 14 is removed from the conveyor tensioning system 10.

Figure 3:
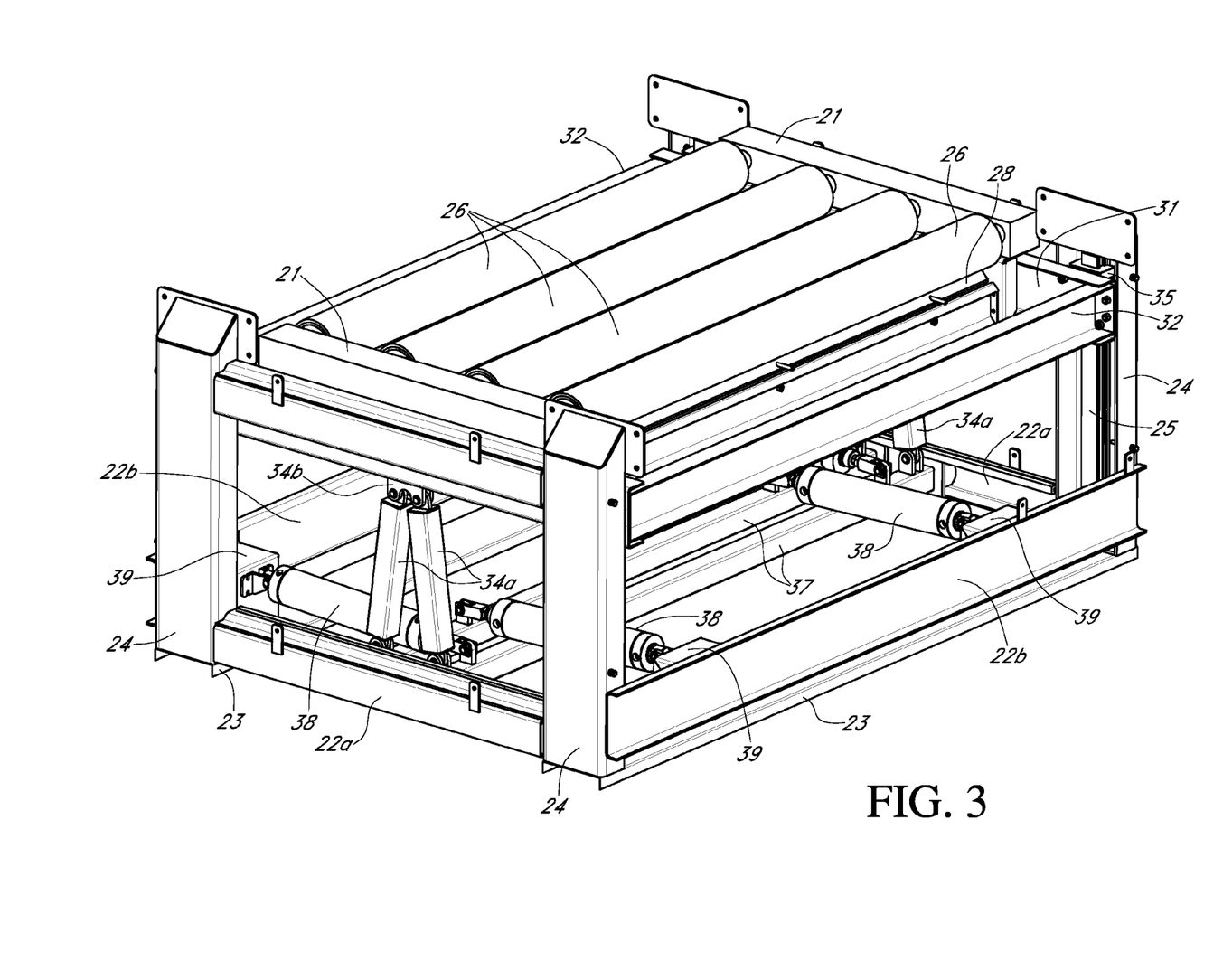
FIG. 3 is a detailed perspective view of an exemplary embodiment of the conveyor tensioning system with guard plates and roller receivers removed for clarity.
Figure 7A:
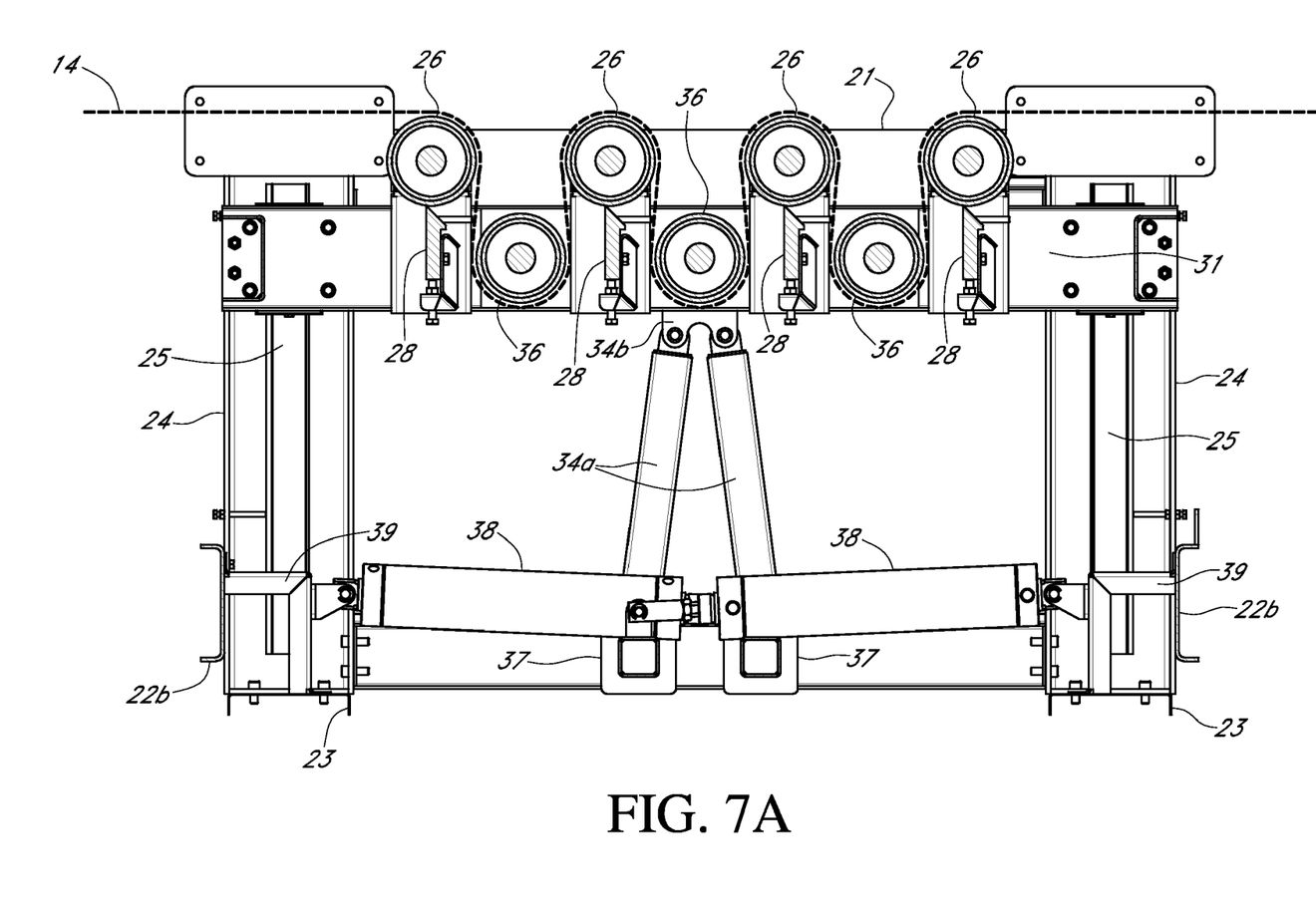
FIG. 7A provides a cross-sectional view of an exemplary embodiment of the conveyor tensioning system with the minimum length of conveyor belt.
Figure 7B:
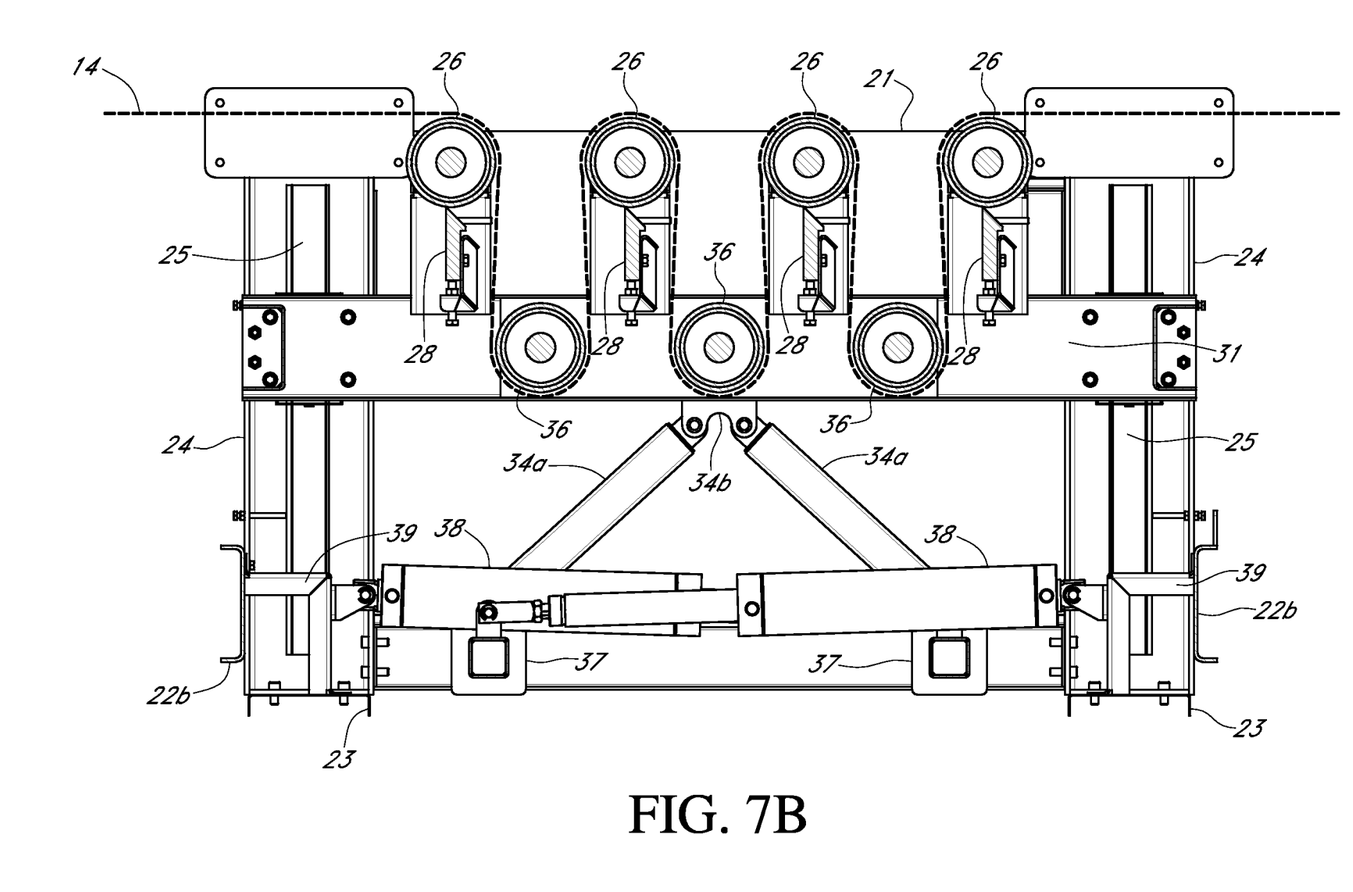
FIG. 7B provides a cross-sectional view of an exemplary embodiment of the conveyor tensioning system with the maximum length of conveyor belt.

One vertical member 24 is affixed to each end of both main frame roller retainers 21, such that the exemplary embodiment of the conveyor tensioning system 10 includes four vertical members 24, which generally bear the load of the conveyor tensioning system 10. In the exemplary embodiment the vertical members 24 are substantially perpendicular to the main frame roller retainers 21 and substantially parallel to one another. However, the optimal orientation of the vertical members 24 with respect to the main frame roller retainers 21 in no way limits the scope of the conveyor tensioning system 10. In other embodiments not pictured herein, the conveyor tensioning system 10 has more than four vertical members 24, and in still other embodiments the conveyor tensioning system 10 has fewer than four vertical members 24. Any number of scrapers 28 may be mounted to the main frame 20 adjacent each of the main frame rollers 26 to remove any debris from the main frame rollers 26. As shown in FIGS. 3 and 7, the scrapers 28 are mounted to the main frame roller retainers 21, but may be mounted elsewhere in other embodiments not pictured herein.

In the exemplary embodiment two main frame channel members 22a are affixed at the ends of the vertical members 24 opposite the main frame roller retainers 21. The main frame channel members 22a are substantially parallel to the main frame roller retainers 21 and substantially perpendicular to the vertical members 24. Accordingly, on one end of the main frame 20, one main frame roller retainer 21, one main frame channel member 22a, and two vertical members 24 cooperate to form a substantially rectangular structure oriented in a vertical plane. A vertical rail 25 is affixed to each vertical member 24. Each vertical rail 25 serves as a main frame interface member and cooperates with a vertical rail engagement member 35 on the moveable frame 30 to provide a movement interface between the main frame 20 and the moveable frame 30, which will be described in more detail below.

For added strength, the exemplary embodiment includes two main frame side members 22b connecting vertical members 24 on opposite ends (but corresponding sides) of the conveyor tensioning system 10. The main frame side members 22b are parallel to the main frame rollers 26 but perpendicular to the main frame roller retainers 21. For even greater strength and support, the exemplary embodiment also includes two main frame bottom members 23 that are parallel to the main frame side members 22b. Adjacent main frame bottom members 23 and main frame side members 22b are affixed to the same vertical members 24. The various components of the main frame 20 may be affixed to one another using any method known to those skilled in the art including but not limited to welding, chemical adhesion, soldering, mechanical fasteners, or combinations thereof. Alternatively the various components of the main frame 20 may be integrally formed with one another, either in whole or in part.

Figure 4:
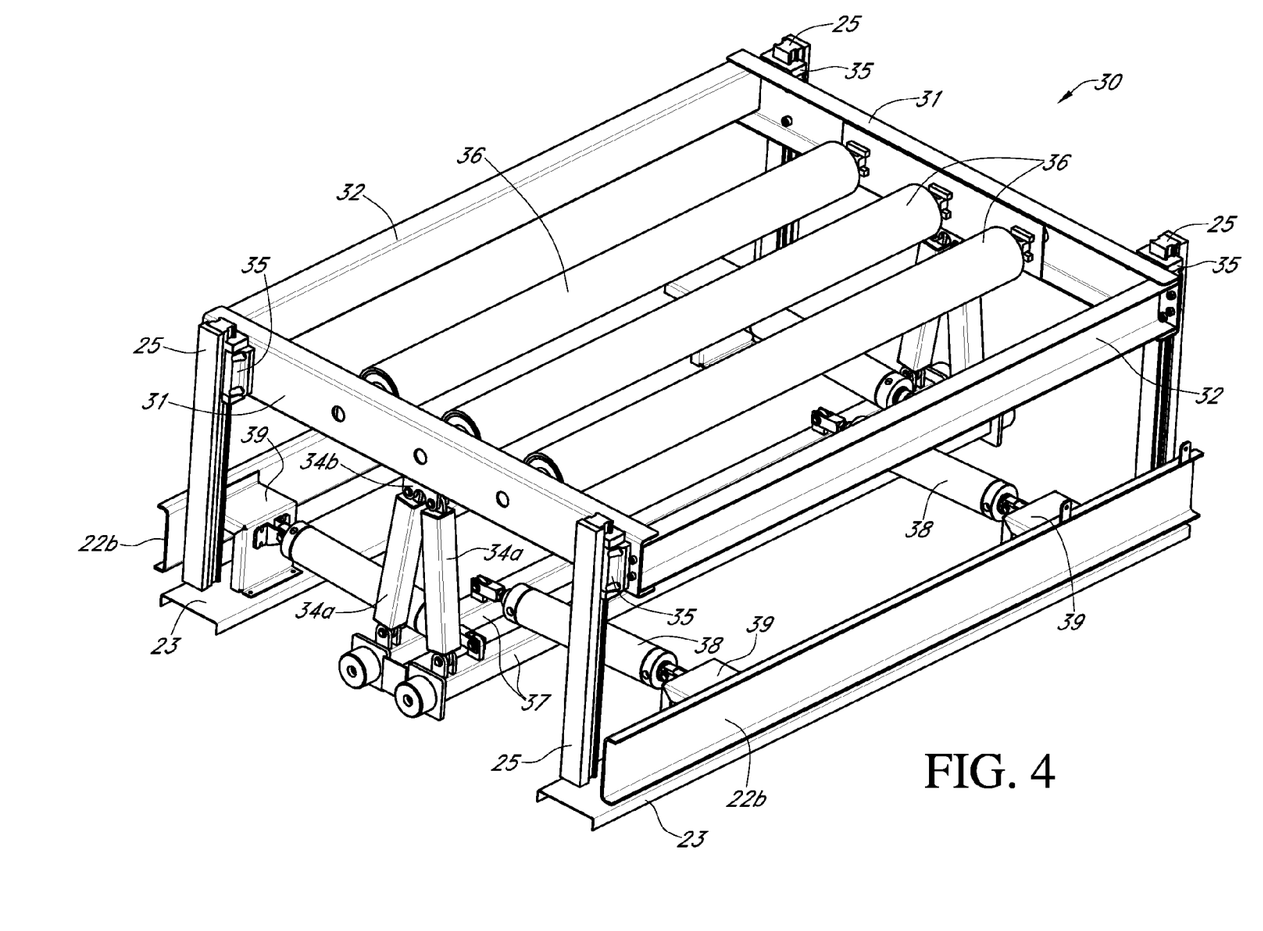
FIG. 4 is a detailed perspective view of one embodiment of the moveable frame assembly.

The moveable frame 30 is shown in FIG. 4 with certain elements of the main frame 20 removed for clarity. A perspective view of the main frame 20 and moveable frame 30 engaged at their respective interface members is shown in FIG. 3. The moveable frame 30 includes two moveable frame roller retainers 31, which are oriented substantially parallel to one another at opposite ends of the conveyor tensioning system 10. Pivotally mounted between the two moveable frame roller retainers 31 are three moveable frame rollers 36, which are parallel to the main frame rollers 26. However, any number of moveable frame rollers 36 may be used, and the optimal number thereof will depend on the specific application of the conveyor tensioning system 10 and the number of main frame rollers 26. In the exemplary embodiment, an angle member retainer 34b is affixed to each moveable frame roller retainer 21, the purpose of which is described in detail below. Although not shown, scrapers 28 may be affixed to the moveable frame 30 to remove debris and/or other material from the moveable frame rollers 36.

Two moveable frame side members 32, which are oriented substantially parallel to one another and substantially perpendicular to the two moveable frame roller retainers 31, are affixed to respective ends of each of the moveable frame roller retainers 31. Accordingly, the configuration of the moveable frame roller retainers 31 and moveable frame side members 32 forms a substantially rectangular structure, which is best shown in FIG. 4. In the exemplary embodiment, two vertical rail engagement members 35 are affixed to each moveable frame roller retainer 31 to engage the respective vertical rails 25 affixed to the vertical members 24 of the main frame 20. Each vertical rail engagement member 35 serves as a moveable frame interface member that cooperates with one of the vertical rails 25 to provide a movement interface between the main frame 20 and the moveable frame 30.

In another embodiment not pictured herein, the main frame 20 interface member is formed as a channel in each vertical member 24 and the moveable frame 30 interface member is formed as a wheel pivotally mounted to the moveable frame 30 that is moveable within the channel in the vertical member 24. Accordingly, each channel and wheel would cooperate to form a movement interface between the main frame 20 and moveable frame 30.

Although not shown in the exemplary embodiment, any number of scrapers 28 may be mounted to the moveable frame 30 adjacent the moveable frame rollers 36 to remove any debris from the moveable frame rollers 36. The scrapers 28 may be mounted to the moveable frame 30 at any part thereof that is structurally sufficient to support the force exerted by the scrapers 28 during use.

Figure 6:
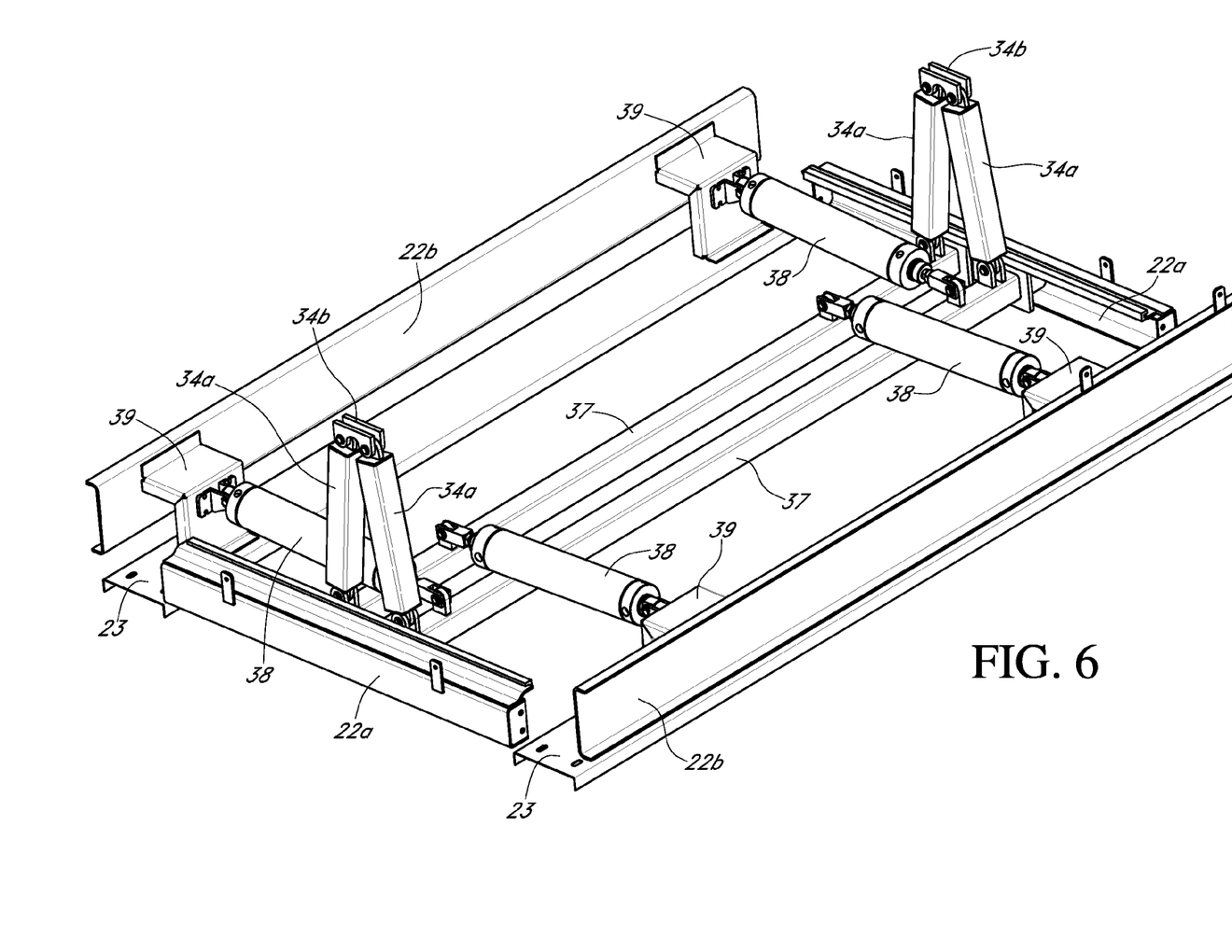
FIG. 6 is a detailed perspective view of an exemplary embodiment of the actuation mechanism.

In the exemplary embodiment, two sliding members 37 are positioned between the two main frame channel members 22a. The sliding members 37 are substantially parallel to one another and the moveable frame side members 32. A perspective view of the sliding members 37 and angle members 34a is shown in FIG. 6, with various other elements removed for clarity. The sliding members 37 are substantially perpendicular to the main and moveable frame roller retainers 21, 31 and the main frame channel members 22a. The interior portion of the main frame channel members 22a is fashioned to engage one end of two sliding members 37 such that the position of each sliding member 37 with respect to the main frame 20 may be adjusted in the horizontal direction.

In the exemplary embodiment, one end of two angle members 34a is pivotally affixed to each sliding member 37 at opposite ends of each sliding member 37 (see FIG. 4). The opposite end of each angle member 34a is pivotally affixed to respective angle member retainers 34b formed on the moveable frame roller retainers 31. Accordingly, two angle members 34a are located adjacent one moveable frame roller retainer 31, and two are located adjacent the other moveable frame roller retainer 31. The pair of angle members 34a adjacent one moveable frame roller retainer are pivotally affixed to different sliding members 37, which is best shown in FIG. 4.

As will be apparent to those skilled in the art in light of the present disclosure, the conveyor tensioning system 10 allows the vertical position of the moveable frame 20 with respect to that of the main frame 20 to be adjusted, thereby adjusting the distance between the main frame rollers 26 and moveable frame rollers 36, which consequently adjusts the tension on the conveyor belt 14. The conveyor tensioning system 10 is shown in FIG. 7A with the minimum distance allowed by the exemplary embodiment between the main frame rollers 26 and the moveable frame rollers 36. FIG. 7B shows the exemplary embodiment in a position between the minimum and maximum allowable distances between the main frame rollers 26 and moveable frame rollers 36.

As the moveable frame 20 is lowered (i.e., adjusted from the position shown in FIG. 7A to that shown in FIG. 7B), the main frame interface members in the exemplary embodiment (i.e., the vertical rails 25) cooperate with the moveable frame interface members in the exemplary embodiment (i.e., the vertical rail engagement members 35) at the movement interface to secure the horizontal position of the main frame 20 with respect to the moveable frame 30 but allow movement along the movement interface in the vertical dimension. Also, the sliding members 37 move away from one another as the moveable frame 30 is lowered, with the ends of the sliding members 37 retained in and slideably engaged with the main frame channel members 22a. Simultaneously, the angle members pivot about their respective points of attachment to both the sliding members 37 and angle member retainers 34b so that the orientation of the angle members 34a changes from substantially vertical (as shown in FIG. 7A) to substantially horizontal.

The path of the conveyor belt 14 through the main frame rollers 26 and moveable frame rollers 36 is shown by the dashed line in FIGS. 7A and 7B. A comparison of those two figures makes clear the fact that when the conveyor tensioning system is in the position shown in FIG. 7B, the distance between the main frame rollers 26 and moveable frame rollers 36 is much greater than that distance shown in FIG. 7A. Accordingly, the conveyor tensioning system 10 may accommodate conveyor belts 14 or varying sizes, and allow the adjustment of the tension of a specifically sized conveyor belt 14 over a wide range of values.

The vertical position of the moveable frame 30 with respect to the main frame 20 may be adjusted manually through a variety of mechanical structures, all of which are readily available to those skilled in the art. For example, a catch and lever system (not shown) may be positioned adjacent the moveable frame 30 so that the moveable frame may be locked in a vertical position in predetermined increments from the uppermost and lowermost positions.

In the exemplary embodiment, four actuators 38 are used to adjust the position of the moveable frame 30. Two actuator braces 39 are positioned on each main frame side member 22b at opposite ends of the main frame side member 22b. A first end of an actuator is affixed to each actuator brace 39, and the second end is affixed to one of the sliding members 37. As shown in FIG. 6, the actuators 38 overlap one sliding member 37 and are affixed to the opposite sliding member 37 rather than the sliding member 37 adjacent the actuator brace 39 to which that actuator 37 is affixed. In the exemplary embodiment, the actuators 38 work to adjust the vertical position of the moveable frame 30 with respect to the main frame 20 by moving the sliding members 37 away or toward the main frame side members 22b.

As the actuators 38 are extended, they exert a force on the sliding members 37 that causes the sliding members 37 to move away from one another and toward each main frame side member 22b in the horizontal direction. Simultaneously the angle members 34a pivot about their respective attachment points and the orientation of the angle members 34a changes from one that is substantially vertical to an orientation that is substantially horizontal, thereby translating the horizontal motion of the actuators 38 and sliding members 37 into vertical motion of the moveable frame 30. Accordingly, the distance between the main frame roller retainers 26 and the moveable frame roller retainers 36 increases, and the tension on a conveyor belt 14 positioned therebetween would increase. The configuration of the exemplary embodiment as pictured herein allows for resilient conveyor belt 14 operation and satisfactory tensioning of the conveyor belt 14 in many applications.

As the actuators 38 are retracted, they exert a force on the sliding members 37 that causes the sliding members 37 to move toward one another and away from each main frame side member 22b. Simultaneously the angle members 34a pivot about their respective attachment points and the orientation thereof changes from substantially horizontal to substantially vertical. Accordingly, the distance between the main frame roller retainers 26 and the moveable frame roller retainers 36 decreases, and the tension on a conveyor belt 14 would decrease.

In the exemplary embodiment, the actuators 38 are those typically powered by pressurized fluid. However, in other embodiments different types of actuators 38 may be used, or no actuators 38 may be used and the position of the moveable frame 30 may be adjusted manually, as described for one embodiment thereof above. In still other embodiments not pictured herein, more or fewer actuators 38 may be used depending on the specific application of the conveyor tensioning system 10.

Fluid powered systems known to those of skill in art, by way of illustration and without limitation, include gas and liquid hydraulic systems. Other systems that may be used to provide force to adjust the position of the moveable frame 30 include mechanical systems such as screws, jacks, and springs. In some applications of the conveyor tensioning system 10 it is contemplated that a shock absorbing or dampening system in the structure used to adjust the position of the moveable frame 30 may be desirable. The configuration of the actuators 38, angle members 34a, and sliding members 37 of the exemplary embodiment provides for dampening through the fluid compression within the actuators 38. Other dampening systems known to those skilled in the art may be used with the conveyor tensioning system 10. For example, spring-loaded rollers having a limited amount of travel (not shown)

may be pivotally mounted to either the main or moveable frame 20, 30 to account for shocks to the conveyor system and/or conveyor belt 14.

Any embodiment of the conveyor tensioning system 10 that includes a dampening system may also be equipped with a control system for maintaining the conveyor belt 14 at a certain tension level. For example, if a spring-loaded roller (not shown) is used to dampen changes introduced in the conveyor belt 14, a control system may be used to detect the force exerted on the spring-loaded roller (not shown), which would directly correlate to the tension of the conveyor belt 14, and adjust the position of the moveable frame 30 accordingly. If the dampening system is simply compressible fluid within the actuators 38, the control system could be configured to monitor the pressure within the actuators 38 and adjust the position of the actuators 38 accordingly. Other control systems may be used and the precise configuration thereof in no way limits the scope of the conveyor tensioning system 10.

It is contemplated that other configurations of the moveable frame 30 with respect to the main frame 20 may be desirable for different uses, some of which are described herein. The main and moveable frame 20, 30 of the exemplary embodiment provide a low profile conveyor tensioning system 10 that will be useful for many existing conveyor belts 14 and conveyor systems used with cooling tunnels 12. Other configurations of the main frame 20 and moveable frame 30 are contemplated and will become obvious to those skilled in the art in light of the present disclosure. Accordingly, an infinite number of variations in the configuration of the main frame 20 and moveable frame 30 exist, and the precise configuration thereof in no way limits the scope of the conveyor tensioning system 10.

In another embodiment not pictured herein, the actuators 38 are positioned substantially vertical rather than substantially horizontal. In this embodiment, no main frame channel members 22a, angle members 34a, angle member retainers 34b, or sliding members 37 are required. Instead, the actuators 38 are positioned between the main frame side members 22b and either the moveable frame roller retainers 31 or moveable frame side members 32. In this embodiment, as the actuators 38 are extended, the distance between the moveable frame rollers 36 and the main frame rollers 26 increases, increasing the tension on the conveyor belt 14. Correspondingly, as the actuators 38 are retracted, the distance between the main frame rollers 26 and moveable frame rollers 36 decreases, decreasing the tension on the conveyor belt 14. An infinite number of configurations of actuators 38 with respect to the main frame 20 and moveable frame 30 and various elements thereof exists, and the optimal configuration thereof will vary from one application of the conveyor tensioning system 10 to the next. Accordingly, the specific orientation and/or configuration of these components in no way limits the scope of the conveyor tensioning system 10.

As previously mentioned, the precise number of main frame rollers 26 and/or moveable frame rollers 36 in no way limits the scope of the conveyor tensioning system 10. Furthermore, the conveyor tensioning system 10 may be configured to have an extremely large amount of adjustment or an extremely small amount of adjustment. For example, the conveyor tensioning system 10 may be configured for use with extremely large conveyor belts 14 so that the maximum distance of travel of the moveable frame 30 with respect to the main frame 20 is sixty inches or greater. In other embodiments the maximum distance of travel may be as little as three inches.

The vertical rails 25 on the main frame 20 and vertical rail engagement members 35 on the moveable frame 30 are examples of an infinite number of interface members for the main frame 20 and moveable frame 30 to form a movement interface therebetween. Many other types of interface members for both the main and moveable frames 20, 30 will be obvious to those skilled in the art in light of the present disclosure. For example, in an embodiment not pictured herein, the interface member on the moveable frame 30 may be configured as a pin (not shown) and the interface member on the main frame 20 may be configured as a channel (not shown) for receiving the pin. Accordingly, the precise structure used for the interface member on the main or moveable frame 20, 30 in no way limits the scope of the conveyor tensioning system 10, and the scope of the conveyor tensioning system 10 extends to any interface members that allow the position of the moveable frame 30 with respect to the main frame 20 to be adjusted in one dimension but be fixed in all others.

In the exemplary embodiment of the conveyor tensioning system 10 the tension applied to the conveyor belt 14 does not result in an angle change at the conveyor belt 14. Typically, applying tension to a moving conveyor belt 14 degrades the conveyor belt 14 and/or results in unequal application of tension to the conveyor belt 14 across its width and the length of the conveyor belt 14 upon which the tensioning system acts. Instead, the conveyor tensioning system 10 applies tension or force to the conveyor belt 14 tangentially to the conveyor belt's 14 main direction of travel, and thus equally across both the width of the conveyor belt 14 and the length of the conveyor belt 14 on which the conveyor tensioning system acts. FIGS. 7A and 7B illustrate the tangential application of force to the conveyor belt 14.

It will be apparent to those of ordinary skill that the structures in the exemplary embodiment of the conveyor tensioning system 10 are just one configuration of practicing the conveyor tensioning system 10 disclosed and claimed herein. Those of ordinary skill will appreciate that the conveyor tensioning system 10 may also be practiced as a method of adding tension to a conveyor belt 14.

Those skilled in the art will also appreciate that the conveyor tensioning system also includes a method for tensioning a conveyor belt 14 comprising driving a conveyor belt 14 in a first direction from a first point to a second point for movement of a product to said second point, substantially in a first plane. The conveyor belt 14 is then returned from the second point to the first point, substantially in a plane parallel to said first plane, wherein the tension of the conveyor belt is controlled during the return of the conveyor belt 14 from the second point to the first point by directing the conveyor belt 14 away from the first plane in a direction substantially tangential to the first plane. The conveyor belt 14 is then re-directed at a pre-determined distance away from the first plane towards the first plane in a direction substantially tangential to the first plane. Thus, by varying the pre-determined distance from the first plane for re-direction of the conveyor belt 14, the tension of the conveyor belt 14 may be controlled. In another method, a scraping step may be added to remove product debris from the conveyor system. In another method of adding tension to a conveyor system accomplished using the exemplary embodiment as pictured herein, the first plane is positioned vertically above the second plane (best shown in FIGS. 7A and 7B). Furthermore, the method for tensioning a conveyor belt 14 may include the further step of and required structure for dampening the conveyor tensioning system 10.

It should be noted that the conveyor tensioning system 10 is not limited to the specific embodiments pictured and described herein, but is intended to apply to all similar apparatuses for tensioning a conveyor belt 14. Modifications and alterations from the described embodiments will occur to those skilled in the art without departure from the spirit and scope of the conveyor tensioning system 10.

The invention claimed is:

1. A conveyor tensioning system comprising:
   a. a main frame comprising:
      i. two opposed main frame roller retainers;
      ii. four vertical members oriented substantially perpendicular to said main frame rollers, wherein two vertical members are affixed adjacent opposite ends of each of said main frame roller retainers;
      iii. at least one main frame roller pivotally engaged between said opposed main frame roller retainers;
      iv. a main frame interface member positioned on at least two of said vertical members;
   b. a moveable frame comprising:
      i. two opposed moveable frame roller retainers;
      ii. two moveable frame side members, wherein each moveable frame side member is affixed to each moveable frame roller retainer;
      iii. at least one moveable frame roller pivotally engaged between said moveable frame roller retainers;
      iv. a moveable frame interface member affixed to at least one of said moveable frame roller retainers, wherein said moveable frame interface member is engaged with said main frame interface member to allow the position of said moveable frame to be changed with respect to said main frame in one dimension.

2. The conveyor tensioning system according to claim 1 wherein said main frame interface member is further defined as a vertical rail, and wherein said moveable frame interface member is further defined as a vertical rail engagement member.

3. The conveyor tensioning system according to claim 1 wherein said at least one main frame roller is further defined as four main frame rollers.

4. The conveyor tensioning system according to claim 1 wherein said at least one moveable frame roller is further defined as four moveable frame rollers.

5. The conveyor tensioning system according to claim 3 wherein said four main frame rollers are further defined as having longitudinal axes that are coplanar.

6. The conveyor tensioning system according to claim 4 wherein said four moveable frame rollers are further defined as having longitudinal axes that are coplanar.

7. The conveyor tensioning system according to claim 1 wherein said conveyor tensioning system further comprises at least one actuator, wherein said at least one actuator is cooperatively engaged with both said main frame and said moveable frame.

8. The conveyor tensioning system according to claim 7 wherein said at least one actuator is further defined as a mechanical actuator that is manually adjusted.

9. The conveyor tensioning system according to claim 5 wherein said at least one actuator is further defined as a fluid-powered actuator.

10. The conveyor tensioning system according to claim 1 wherein said conveyor tensioning system further comprises:
    a. two opposed main frame channel members affixed to said four vertical members, wherein said two opposed main frame channel members are substantially perpendicular said main frame rollers;
    b. two sliding members engaged with said two main frame channel members, wherein said two sliding members are substantially parallel said main frame rollers; and
    c. four angle members, wherein a first set of two angle members is pivotally affixed to each sliding member, and wherein a second set of two angle members is pivotally affixed to either said moveable frame roller retainer.

11. The conveyor tensioning system according to claim 10 wherein said conveyor tensioning system further comprises at least one actuator, wherein said at least one actuator is affixed to said main frame and one of said two sliding members.

12. The conveyor tensioning system according to claim 1 wherein said conveyor tensioning system is further defined as being installed on a conveyor system used with a cooling tunnel.

13. The conveyor tensioning system according to claim 1 wherein said conveyor tensioning system further comprises a spring-loaded roller pivotally affixed to said main frame.

14. The conveyor tensioning system according to claim 13 wherein said conveyor tensioning system further comprises a control system in communication with said spring-loaded roller and said moveable frame.

15. A conveyor tensioning system comprising:
    a. a main frame comprising:
       i. a first and second main frame roller retainer each having a first and second end, wherein said first and second main frame roller retainers are oriented parallel to one another and substantially horizontal;
       ii. a first, second, third, and fourth vertical member each having a first and second end, wherein said first vertical member first end is affixed to said first end of said first main frame roller, wherein said second vertical member first end is affixed to said second end of said first main frame roller, wherein said third vertical member first end is affixed to said first end of said second main frame roller, wherein said fourth vertical member first end is affixed to said second end of said second main frame roller, and wherein said first, second, third, and fourth vertical members are oriented substantially vertically such that said vertical members are substantially perpendicular to said first and second main frame roller retainers;
       iii. four vertical rail members, wherein each said vertical rail member is affixed to a respective said vertical member;
       iv. a first and second main frame channel member each having a first and second end, wherein said first main frame channel member first end is affixed to said first vertical member second end, wherein said first main frame channel member second end is affixed to said second vertical member second end, wherein said second main frame channel member first end is affixed to said third vertical member second end, wherein said second main frame channel member second end is affixed to said fourth vertical member second end, wherein said first and second main frame channel members are oriented substantially horizontally such that said first and second main frame channel members are substantially perpendicular to said first, second, third, and fourth vertical members;
       v. at least one main frame roller, wherein said main frame roller is pivotally engaged with said first and second main frame roller retainers at either end of said main frame roller;
    b. a moveable frame slideably engaged with said main frame, said moveable frame comprising:
       i. a first and second moveable frame roller retainer each having a first and second end, wherein said first and second moveable frame roller retainers are oriented parallel to one another and substantially horizontal;

ii. a first and second moveable frame side member each having a first and second end, wherein said first end of said first moveable frame side member is affixed to said first end of said first moveable frame roller retainer, wherein said second end of said first moveable frame side member is affixed to said first end of said second moveable frame roller retainer, wherein said first end of said second moveable frame side member is affixed to said second end of said first moveable frame roller retainer, wherein said second end of said second moveable frame side member is affixed to said second end of said second moveable frame roller retainer, and wherein said first and second moveable frame side members are oriented parallel to one another and substantially horizontal such that said pair of moveable frame roller retainers and said pair of moveable frame side members form a substantially rectangular structure;

iii. a first and second angle member retainer, wherein said first angle member retainer is affixed to said first moveable frame roller retainer, and wherein said second angle member retainer is affixed to said second moveable frame roller retainer;

iv. at least one moveable frame roller, wherein said moveable frame roller is pivotally engaged with said first and second moveable frame roller retainers at either end of said moveable frame roller;

v. a first and second sliding member each having a first and second end, wherein said first end of said first sliding member is slideably engaged with said first main frame channel member, wherein said second end of said first sliding member is slideably engaged with said second main frame channel member, wherein said first end of said second sliding member is slideably engaged with said first main frame channel member, wherein said second end of said second sliding member is slideably engaged with said second main frame channel member, and wherein said first and second sliding members are oriented parallel to one another and substantially horizontal;

vi. a first, second, third, and fourth angle member each having a first and second end, wherein said first end of said first angle member is pivotally affixed to said first angle member retainer, wherein said second end of said first angle member is pivotally affixed to said first sliding member, wherein said first end of said second angle member is pivotally affixed to said first angle member retainer, wherein said second end of said second angle member is pivotally affixed to said second sliding member, wherein said first end of said third angle member is pivotally affixed to said second angle member retainer, wherein said second end of said third angle member is pivotally affixed to said first sliding member, wherein said first end of said fourth angle member is pivotally affixed to said second angle member retainer, and wherein said second end of said fourth angle member is pivotally affixed to said second sliding member;

vii. a first, second, third, and fourth vertical rail engagement member, wherein said first vertical rail engagement member is affixed to said first end of said first moveable frame roller retainer and slideably engaged with one of said vertical rails, wherein said second vertical rail engagement member is affixed to said second end of said first moveable frame roller retainer and slideably engaged with one of said vertical rails, wherein said third vertical rail engagement member is affixed to said first end of said second moveable frame roller retainer and slideably engaged with one of said vertical rails, and wherein said fourth vertical rail engagement member is affixed to said second end of said second moveable frame roller retainer and slideably engaged with one of said vertical rails; and viii. at least one actuator having a first and second end, wherein said first end of said actuator is affixed to said first sliding member, and wherein said second end of said actuator is affixed to said second sliding member.

\* \* \* \* \*